United States Patent [19]

Eiffler et al.

[11] Patent Number: 5,109,074
[45] Date of Patent: Apr. 28, 1992

[54] PROCESS FOR PREPARING AN AMINOMETHYLPHOSPHONIC CHELATING RESIN

[75] Inventors: Jurgen Eiffler; Gerhard Joeken; Hans-Peter Schneider, all of Stade, Fed. Rep. of Germany

[73] Assignee: The Dow Chemical Company, Midland, Mich.

[21] Appl. No.: 367,529

[22] Filed: Jun. 16, 1989

[30] Foreign Application Priority Data

Jun. 16, 1988 [GB] United Kingdom ............... 8814275

[51] Int. Cl.$^5$ ............... C08F 8/40; B01J 45/00; C01D 13/14
[52] U.S. Cl. ............... 525/340; 210/688; 521/30; 521/32; 521/39; 525/326.7
[58] Field of Search ............... 525/340, 326.7; 210/688; 521/30, 32, 39

[56] References Cited

U.S. PATENT DOCUMENTS 4,002,564  1/1977  Carbonel ............... 525/340

FOREIGN PATENT DOCUMENTS 0087934  7/1983  European Pat. Off. .
2279453  3/1976  France .
2442859  6/1980  France .
859834   1/1961  United Kingdom .

OTHER PUBLICATIONS

Szczepaniak, W. et al., Chemia Analityczna, vol. 18, 1973, pp. 1019-1026.

Primary Examiner—Joseph L. Schofer
Assistant Examiner—Fred Zitomer

[57] ABSTRACT

Aminomethylphosphonic chelating resins are prepared by amination, hydrolysis and methylphosphonation of haloalkylated polymer beads. The amination of the haloalkylated polymer beads is carried out with hexamethylenetetramine. The produced haloaminated beads are hydrolysed and methylphosphonated in one single step without addition of a substantial amount of formaldehyde or a formaldehyde releasing compound.

18 Claims, No Drawings

PROCESS FOR PREPARING AN AMINOMETHYLPHOSPHONIC CHELATING RESIN

BACKGROUND OF THE INVENTION

The present invention relates to a process for preparing an aminomethylphosphonic chelating resin by amination. hydrolysis and methylphosphonation of haloalkylated polymer beads. Aminomethylphosphonic chelating resins are for example useful for removing multivalent, alkaline earth metal cations such as calcium ions or heavy metal cations such as copper ions from salt solutions.

Processes for preparing aminomethylphosphonic chelating resins and resins containing similar functional groups are generally known. British Patent 2 040 950 and French patent application 2 442 859 disclose a method of producing ion exchange resins containing (aminomethyl)(hydroxymethyl)phosphinic acid groups by aminating chloromethylated copolymers of styrene and divinylbenzene, for example with ethylene diamine or monoethanolamine. Hexamethylenetetramine is also suggested as an aminating agent for producing polyvinylbenzylamine. The aminated copolymers are then treated with formalin or another source of formaldehyde and with a salt of hyphosphorous acid in an acidic medium.

British patent 859,834 discloses amphoteric ion-exchange resins comprising a polymeric substituted-aminomethyl phosphonate which are produced by reacting a dialkyl or diaryl hydrogen phosphonate with a mixture of a phenol-formaldehyde condensate polymer and a primary or secondary amine and then partially hydrolysing the product.

Amine- and phosphonate containing polymers are produced according to Chemical Abstracts, vol 99, no. 12 September 1983, page 35, abstract no. 89074s by reacting a chloromethylated divinylbenzene-styrene copolymer with sodium carbonate to produce a copolymer having -CHO groups and reacting the produced aldehyde copolymer with ammonia or a primary amine and then with $H_3PO_3$.

According to Chemical Abstracts, vol 98, no. 22, May 1983, page 33, Abstract no 180408u resins containing aminomethylphosphonic groups are produced by reacting aminomethylated divinylbenzene-styrene copolymers with formaldehyde and then with phosphorous acid. In Chemical Abstracts, vol 80, no. 16, April 1974, page 28, abstract no. 83990y a similar method is described, however the phosphorous acid and formaldehyde are premixed and hexamethylenetetramine is used for aminating chloromethylated divinylbenzene-styrene copolymers.

European patent application 0 065 120 suggests reacting an amino resin having amine-reactive groups with an amino compound to produce an aminated resin and subsequently reacting the produced aminated resin with an alkylphosphonation agent in a known way, for example with formaldehyde and a phosphonation agent such as phosphorous acid or phosphorous trichloride.

European patent application 87934 discloses macroporous alkylamino phosphonic chelating resins and a process for preparing them. In the described process a reticulated vinylaromatic macroporous matrix is prepared and aminophosphonic functional groups are successively introduced by effecting the steps of chloromethylation, amination, hydrolysis and alkylphosphonation. The chloromethylation of a styrenedivinylbenzene matrix is carried out with a mixture of formaldehyde and methanol. The mixture is heated for 4 hours and then neutralised with sodium hydroxide. The chloromethylated copolymer beads are washed. The amination is then carried out with a mixture of methylal and hexamethylene tetramine or with other nitrogenous compounds. The reaction takes 6 hours. The beads are dried and then washed until complete disappearance of the traces of amine and methylal. The hydrolysis is then carried out by contacting the aminated resin beads with hydrochloric acid during 4 hours at 45° C. The hydrolysed beads are then dried and washed until neutrality. These beads are then subjected to alkylphosphonation by contacting them with phosphorous acid or another phosphonation agent, formaldehyde and hydrochloric acid for 3 hours. Unfortunately, these repeated purification and drying steps are time-consuming, consume much energy and produce an undesirable amount of waste water.

U.S. Pat. No. 4,002,564 basically suggests the same process for preparing cation-exchange resins having a gel-type or macroporous matrix and aminomethylphosphonic groups as European patent application 87,934. In U.S. Pat. No. 4,002,564 phosphorous trihalide is suggested as a phosphonating agent.

Accordingly, one object of the present invention is to provide a new process for preparing aminomethylphosphonic chelating resins. Another object of the present invention to provide a process for preparing aminomethylphosphonic chelating resins wherein less waste producing purification and drying steps are necessary.

SUMMARY OF THE INVENTION

Accordingly, one aspect of the present invention is a process for preparing an aminomethylphosphonic chelating resin by amination, hydrolysis and methylphosphonation of haloalkylated polymer beads which process is characterised in that the haloalkylated polymer beads are aminated with hexamethylenetetramine and the produced haloaminated beads are hydrolysed and methylphosphonated in one single step without addition of a substantial amount of formaldehyde or a formaldehyde releasing compound.

Another aspect of the present invention is a process for preparing an aminomethylphosphonic chelating resin by hydrolysis and methylphosphonation of haloaminated polymer beads having groups of formula II

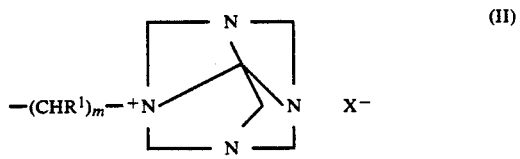

wherein each $R^1$ independently is hydrogen, alkyl, cycloalkyl or aryl,

X is halogen and m is from 1 to 12, which process is characterised in that the hydrolysis and methylphosphonation are carried out in one single step without addition of a substantial amount of formaldehyde or a formaldehyde releasing compound.

By the expression "the hydrolysis and methylphosphonation are carried out in one single step" is meant that the hydrolysed polymer beads are not purified or dried prior to the methylphosphonation. It is preferred to contact the haloaminated beads simultaneously with the hydrolyzing agent and the phosphonating agent but the haloaminated beads can also be contacted with the hydrolyzing agent such as an acid first.

By the expression "without addition of a substantial amount of formaldehyde or a formaldehyde releasing compound" is meant that less than about 10 percent, preferably less than about 5 percent and more preferably less than about 2 percent of formaldehyde or a formaldehyde releasing compound, which is consumed in the methylphosphonation step, is added to the haloaminated beads. Most preferably, no formaldehyde or formaldehyde releasing compound is added to the haloaminated beads.

Yet another aspect of the present invention is a method of removing alkaline earth metal ions or transition metal ions or both from a solution containing such ions by treating the solution with a resin prepared according to a process of the present invention.

The process of the present invention has several advantages. According to the generally applied process which has been described in European patent application 87,934 and in U.S. Pat. No. 4,002,564 the chloromethylated copolymer beads which have been aminated with hexamethylenetetramine, that is the intermediate hexamethylenetetramine/resin complex, is subjected to a hydrolysis, washing and drying step. In the hydrolysis step formaldehyde is released when the aminated resin is contacted with water. The formaldehyde is removed from the beads which contaminates the wash water and the drying step consumes energy. According to the process of the present invention, the waste of 6 moles of formaldehyde per mole of produced primary amine group in the resin is avoided. Furthermore, a waste water producing and/or energy consuming washing and/or drying step of the aminated, hydrolysed resin beads is not necessary in the processes of the present invention.

In the process described in the European patent application 87,934 and in U.S. Pat. No. 4,002,564 the aminated, hydrolysed resin beads containing aminoalkyl groups are methylphosphonated by contacting the resin with an excess of phosphorous acid or phosphorous trichloride and formaldehyde. The process of the present invention is carried out without addition of a substantial amount of formaldehyde or a formaldehyde releasing compound. Accordingly, not only the contamination of water with formaldehyde can be reduced drastically but also a substantial saving in raw materials can be achieved.

Surprisingly, it has been found that the ion exchange capacities such as the copper capacity of the chelating resins produced according to the process of the present invention are comparable to those of the ion exchange resins produced according to the generally applied process, as described in European patent application 87934.

DETAILED DESCRIPTION OF THE INVENTION

The aminomethylphosphonic chelating resin preferably has functional groups of the formula

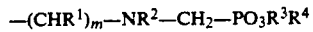 (I)

wherein
R$^1$ is hydrogen, alkyl, cycloalkyl or aryl;
R$^2$ is hydrogen or —PO$_3$R$^3$R$^4$;
R$^3$ and R$^4$ each independently are hydrogen, alkyl, cycloalkyl or aryl; and
m is from 1 to 12.

The preferred meanings for R1 and m are stated below. When R$^3$ or R$^4$ or both is alkyl, it preferably has from 1 to 12, more preferably from 1 to 6 and most preferably from 1 to 3 carbon atoms. Preferred alkyl radicals are methyl, ethyl, n-propyl, isopropyl, n-butyl, isobutyl, pentyl and hexyl. Preferred aryl radicals are benzyl and phenyl. When R$^3$ or R$^4$ or both is cycloalkyl, it preferably has from 4 to 12, more preferably from 5 to 8 and most preferably 6 carbon atoms.

The haloalkylated polymer beads which are used as starting materials in the process of the present invention are known. They have a polymeric matrix and haloalkyl groups. The alkyl groups may be substituted by inert substituents such as cycloalkyl or aryl. The haloalkylated polymer beads preferably have groups of formula III

 (III)

herein each R$^1$ independently is hydrogen, alkyl, cycloalkyl or aryl,
X is halogen and
m is from 1 to 12.

When R$^1$ is cycloalkyl it preferably has from 4 to 12, more preferably from 5 to 8, most preferably 6 carbon atoms. The preferred aryl radical is phenyl or benzyl. When R$^1$ is alkyl it preferably has 1 to 12, more preferably 1 to 6, most preferably 1 to 3 carbon atoms. Preferred alkyl radicals are methyl, ethyl, n-propyl, isopropyl, n-butyl, isobutyl, pentyl and hexyl. Hydrogen is the most preferred meaning for R$^1$.

m preferably is from 1 to 6, more preferably from 1 to 3, most preferably 1.

X preferably is bromine, or, more preferably, chlorine.

Various cross-linked polymers are useful as a matrix for the haloalkylated polymer beads. Useful matrices are well known in the art and are for example described in the book "Ion exchange" by F. Helfferich, McGraw-Hill Book Co., N.Y. 1962 and in "Ullmann's Enzyklopadie der Technischen Chemie", 4th Edition, Vol. 13, pages 279 et seq. One known type of matrices is based on phenol/formaldehyde condensation polymers which are cross-linked with an aldehyde, a chlorinated hydrocarbon or an epoxy compound. The preferred matrices are cross-linked polystyrene or poly(alphamethylstyrene) or cross-linked polymer beads of styrene or alphamethyl styrene which is substituted at the benzene ring with C$_{1-6}$-alkyl, for example methyl, ethyl, tert. butyl, isopropyl, or a halogenoalkyl, e.g. chloromethyl, or aminomethyl. The cross-linking agent preferably is an alkyl acrylate or a di- or polyvinyl compound such as trivinyl cyclohexane, ethylene glycol dimethacrylate or trimethylolpropane triacrylate, trivinylbenzene and most preferably divinylbenzene. Divinylbenzene typically is copolymerised with a substituted or the unsubstituted styrene.

The following description relates to haloalkylated polymer beads which have such a preferred cross-linked styrene-divinylbenzene copolymer matrix, although the process of the present invention is not limited to the use of these types of starting materials.

The haloalkylated polymer beads can have a macroporous or gel type (microporous) structure. The macroporous haloalkylated polymer beads preferably have an average pore diameter of more than 10 nm. The microporous haloalkylated polymer beads preferably have an average pore diameter of less than 10 nm, more preferably of 0.5 to 2 nm.

The most preferred haloalkylated polymer beads are cross-linked spheroido gel-type copolymer beads which have a core/shell morphology. By the term "core/shell morphology" it is meant that the polymeric structure of the copolymer beads changes from the inside to the outside of the bead. Such changes in polymeric structure may be somewhat gradual yielding a bead having a gradient of polymeric structure along the radius. Alternatively, said changes in polymeric structure may be relatively abrupt as one moves along a radius of the bead outward from the center. The effect in any case is that these gel type resin beads have a relatively distinct core having one polymeric structure and a relatively distinct shell having another polymeric structure. The core/shell morphology of the copolymer beads is detectable using known analytical techniques such as those mentioned in European patent application 0 101 943. The core/shell copolymer beads preferably have a shell containing a lower proportion of cross-linking monomers than the core. In this way, beads of this type will have a shell which is softer (less friable and more elastic) than the core of the bead. This permits the bead to distribute energy throughout its structure when subjected to external stresses and pressures while retaining its shape and integrity. It is believed that this improves the crush strength and resistance to osmotic shock of such core/shell copolymer beads. In addition to the difference in cross-link densities of the core and shell, the polymer in the shell can advantageously have a higher molecular weight than the polymers of the core. Haloalkylated polymer beads which exhibit a core/shell morphology and methods of preparing them are described in detail in European patent application 0 101 943. Further methods of haloalkylating the crosslinked copolymers and the haloalkylating agents included in such methods are for example described in U.S. Pat. Nos. 2,642,417; 2,960,480; 2,597,492; 2,597,493; 3,311,602 and 2,616,817, in European patent application 87934 and in *Ion Exchange* by F. Helfferich, published in 1962 by McGraw-Hill Book Company, N.Y. and above mentioned "Ullmann's Enzyklopadie der Technischen Chemie".

Typically, the haloalkylation reaction involves swelling of the cross-linked polymer with a haloalkylating agent, preferably bromomethylmethyl ether, chloromethylmethyl ether or a mixture of formaldehyde and hydrochloric acid, most preferably chloromethylmethyl ether, and then reacting the polymer and haloalkylating agent in the presence of a Friedel-Craft catalyst such as zinc chloride, iron chloride or aluminum chloride. Thereby, polymer beads having groups of formula III above are prepared.

The produced haloalkylated polymer beads may be purified in a known way, for example by washing them with water, and optionally dried before using them in the process of the present invention.

The amination of the haloalkylated polymer beads with hexamethylenetetramine is generally known and for example described in European patent application 87934. The amination step generally comprises heating a mixture of the haloalkylated polymer beads and at least a stoichiometric amount of hexamethylenetetramine over a period of time and a temperature sufficient to react hexamethylenetetramine with the halogen atoms. A reaction medium such as water, ethanol, methanol, methylene chloride, ethylene dichloride, dimethoxymethylene, methylal (formaldehyde dimethyl acetal) is optionally but advantageously employed. A reaction medium which is useful for swelling the haloalkylated polymer beads such as formaldehyde dimethyl acetal is preferred. A complete amination is generally achieved within 2 to 10 hours and reaction temperatures between 25° C. and 60° C. The produced haloaminated beads are preferably purified, for example by thorough washing with water. Although the beads may be dried, preferably the wet polymer beads are used for further reaction.

The produced haloaminated polymer beads preferably have groups of formula II

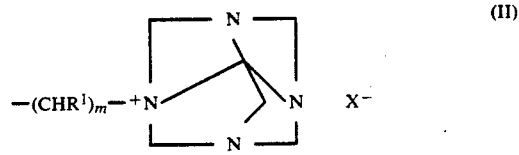

wherein each R1 independently is hydrogen, alkyl, cycloalkyl or aryl,
X is halogen and
m is from 1 to 12.

The preferred meanings of $R^1$, m and X are stated with reference to formula III above. Those haloaminated beads are the most preferred ones which have above mentioned groups of formula II wherein R1 is hydrogen, X is chlorine and m is 1.

The haloaminated beads are hydrolysed and methylphosphonated without addition of a substantial amount of formaldehyde or formaldehyde releasing compound. A time and energy consuming separation and purification of the polymer beads after hydrolysis and addition of fresh formaldehyde is unnecessary in the process of the present invention.

The hydrolysis of the haloaminated beads can be carried out in a known way by means of an acid, preferably a strong inorganic acid such as hydrochloric acid and the hydrolyzed beads are subjected to the methylphosphonation as described below. The hydrolyzed beads are not purified or dried. However, it is preferred to contact the haloaniminated beads simultaneously with the acid used for hydrolysis and with the phosphonating agent as described below. Phosphorous acid can act as hydrolyzing and phosphonating agent.

During the methylphosphonation a portion of the formaldehyde is consumed which is produced when the haloaminated polymer beads having groups of formula II are contacted with water which is present in the hydrolysis and methylphosphonation step.

Various phosponating agents are useful, such as phosphorous acid ($H_3PO_3$), phosphite salts, preferably the alkali metal or alkaline earth metal salts of phosphorous acid, more preferably the sodium or potassium phospite; or a mono- or diester of phosphorous acid, preferably a mono- or dialkylester, such as a mono- or di-$C_{1\text{-}6}$-alkylester of phosphorous acid. Phosphonating agents which produce phosphorous acid in situ, such as phosphorous halides or oxides are also useful. Thereof, $P_2O_5$, $PBr_3$ and, in particular, $PCl_3$ are preferred.

Phosphorous acid can be used alone or in combination with an additional acid. If phosphorous acid is used alone, generally from 1 to 20 moles, preferably from 5 to 15 moles, most preferably from 8 to 12 moles, of phosphorous acid is used per mole of groups of formula II. The molar amount of groups of formula II can be determined by hydrolysing a sample of the resin with an acid and determining the weak base capacity of the hydrolysed resin beads. It is known how to hydrolyse the groups of formula II and how to determine the weak base capacity after hydrolysis. If phosphorous acid is used alone, preferably phosphorous acid is dissolved in an aqueous suspension of the haloaminated beads in such an amount that the aqueous suspension contains from about 40 to about 80 weight percent, more preferably from about 70 to about 80 weight percent, phosphorous acid, based on the water weight.

Preferably, phosphorous acid is used in combination with another acid, for example a strong inorganic acid such as hydrochloric acid. When an additional acid is used, generally from 1 to 20 moles, preferably from 1 to 6 moles, more preferably from 2 to 6 moles of phosphorous acid is used per mole of groups of formula II. In the presence of an additional acid, the aqueous suspension of the polymer beads preferably contains from 2 to 80 weight percent, more preferably from 5 to 70 weight percent, most preferably from 20 to 60 weight percent, phosphorous acid, based on the water weight. The molar ratio between the additionally used acid and the groups of formula II generally is from 0.1 to 35:1, preferably from 1 to 15:1 and more preferably from 3 to 6:1. The molar ratio of phosphorous acid to the inorganic acid preferably is from 0.05 to 100:1, more preferably from 0.1 to 20:1 and most preferably from 0.3 to 10:1.

Although aqueous solutions of phosphorous acid in the above mentioned concentration are preferably used, in another embodiment of the present invention solid phosphorous acid may be used.

In a preferred embodiment of the present invention phosphorous acid and hydrochloric acid are produced in situ by reacting $PCl_3$ with water. The polymer beads may be suspended in the water prior to, during or after addition of $PCl_3$. The molar ratio between water and $PCl_3$ preferably is from 5 to 150:1, more preferably from 15 to 80:1. $PBr_3$ or $P_2O_5$ are useful instead of $PCl_3$. $PCl_3$ and water should be reacted in a controlled manner. Preferably, the reaction is carried out in a closed reactor at a pressure of up to 5 bar at a temperature of up to 120° C.

Alternatively, a phosphite salt or a mono- or diester of phosphorous acid can be used in combination with an acid as a phosphonating agent. The molar ratio between a phosphite salt or a mono- or diester of phosphorous acid and the inorganic acid preferably is from 0.05 to 20:1, more preferably from 0.1 to 10:1 and most preferably from 0.2 to 5:1.

When a phosphite salt or a mono- or diester of phosphorous acid is used in combination with an acid or when phosphorous acid is used in combination with an additional acid, preferably strong inorganic acids such as hydrochloric acid, hydrobromic acid, phosphoric acid, sulfurous acid or sulfuric acid are used. Such an inorganic acid is preferably used as an about 10 to about 50 weight percent aqueous solution.

In the practice of the present invention the haloaminated beads are suspended in water, in the phosphonating agent, in the optionally used additional acid or in a mixture thereof. Upon addition of all reactants the reaction mixture is heated, preferably to a temperature between about 40° C. and about 150° C., more preferably between about 70° C. and about 100° C. It is understood that the temperature can be raised before all reactants have been added. The reaction period of course depends on the temperature. When the temperature is between 70° C. and 100° C., the hydrolysis and methylphosphonation step generally is completed in 30 minutes to 8 hours, typically in 1 to 4 hours.

When carrying out the process of the present invention the phosphonating agent such as a phosphite salt, phosporous acid or a mono- or diester thereof and the above mentioned inorganic acid may be added to the haloaminated beads at the same or at different times. The inorganic acid may be added to the haloaminated beads before or after the phosphonating agent. It is not very critical whether a solid phosphonating agent is added to an aqueous suspension of the haloalkylated polymer beads or whether the haloalkylated polymer beads are added to an aqueous solution of the phosphonating agent and/or of the inorganic acid, however, the process of the present invention has to be carried out in the presence of water.

The aminomethylphosphonic chelating resin produced according to the above described processes of the present invention are useful for absorbing and removal of alkaline earth metal ions, such as calcium, magnesium, strontium and/or barium ions, and/or transition metal ions, such as those of group VIII of the periodic table of elements, for example of iron, cobalt, nickel, of group IIIB such as lanthanum, of group IIB such as zinc, cadmium and mercury, of group IIIA such as aluminum, gallium, of group IVA such as lead and preferably of group IB such as copper and silver, or $UO_2^{2-}$.

The invention is further illustrated by the following examples which should not be construed to limit the scope of the present invention. Unless otherwise mentioned, all parts and percentages are weight parts and weight percentages. The total copper wet volume capacity and the dynamic total calcium capacity of the resins produced according to the present invention are measured as described below.

The total copper wet volume capacity of the sodium form of the produced chelating resin is determined by contacting the resin beads with a solution of 60 g of $CuSO_4.5H_2O$ and 120 ml of concentrated ammonium hydroxide diluted with water to 1 liter, washing the beads with water to remove excess copper and then with 2N sulfuric acid to remove the copper ions bound to the functional groups. The amount of copper removed from the beads with 2N sulfuric acid is determined using a potassium iodide/sodium thiosulfate oxidation/reduction titration. The total copper wet volume capacity is expressed as milliequivalents per ml of wet resin. By drying a wet resin sample having a determined volume and determining its weight, the total copper dry weight capacity can be calculated.

The dynamic total calcium capacity of the produced chelating resin is determined using the sodium form of the resin at a pH of 10 to 12. The resin is transferred to a column equipped with a heating jacket. A chemically pretreated brine containing up to 2 milligrams calcium per liter of brine is passed through the resin at 60° C. and at a flow rate of 30 bed volumes of brine per hour. During the run the column effluent is monitored for calcium by colorimetry. This is done in order to determine when the resin bed is no longer removing the calcium to a sufficiently low level. This endpoint is set at 0.05 milligrams calcium per liter brine. With the chelating resin produced according to the invention the calcium concentration is below 0.02 milligrams calcium per liter brine for most of the cycle. When the endpoint of 0.05 milligrams calcium per liter brine is reached in the effluent, the regeneration of the resin is initiated by treating it with acid, deionised water and caustic. The solutions which are thus collected from the column are analysed for calcium and the value for the resin dynamic capacity is calculated. The dynamic total calcium capacity is expressed as grams calcium per liter of resin.

The chloromethylated copolymer beads having a core/shell morphology employed in Examples 1 to 4 and 7 to 29 and in Comparative Example A are prepared from commercially available styrene/divinylbenzene beads having a core/shell morphology by chloromethylating the beads with chloromethyl ether according to the teachings of "Ullmann's Enzyklopadie der Technischen Chemie", 4th Edition, Vol. 13, pages 300 ff. and European patent application 101 943. The preparation of the styrene/divinylbenzene beads having a core/shell morphology is also disclosed in European patent application 101 943.

The macroporous chloromethylated copolymer beads employed in Examples 5 and 6 and in Comparative Example B are analogously prepared from commercially available styrene/divinylbenzene beads.

EXAMPLE 1

194 g of chloromethylated copolymer beads are swollen in 350 ml formaldehyde dimethyl acetal at 43° C. for 45 minutes. The chloromethylated copolymer beads have a cross-linked styrene-divinylbenzene copolymer matrix and have a core/shell morphology. The copolymer beads contain about 3 percent copolymerised divinylbenzene in the core and about 8 copolymerised divinylbenzene in the shell, based on the total copolymer weight. The chloromethylated beads have a wet volume capacity of 1.38 meq/ml.

To the mixture of the chloromethylated beads and formaldehyde dimethyl acetal a solution of 215 g of hexamethylenetetramine in 280 g of water is added. The reaction mixture is stirred for 6 hours and the temperature is maintained at 45° C. The produced chloroaminated beads having groups of formula II wherein R1 is hydrogen, m is 1 and X is chlorine are filtrated and thoroughly washed with water.

118 g of the wet chloroaminated beads are placed into a reactor. A solution of 145 g of phosphorous acid in 65 ml of water and 175 ml of a 16 percent aqueous solution of a hydrochloric acid are added. The reaction mixture is stirred, heated to 90° C. and maintained at this temperature for 4 hours. After cooling to room temperature the resin is thoroughly washed with water.

According to the elementary analysis the resin has 3.34 percent nitrogen and 9.69 percent phosphor. The total copper wet volume capacity is 2.1 meq/ml. The dynamic total calcium capacity is 22.1 g calcium per liter of resin. After the resin has been regenerated with 4N hydrochloric acid and 4N sodium hydroxide, the dynamic total calcium capacity of the produced aminomethylphosphonic chelating resin is 18.3 g per liter of resin.

COMPARATIVE EXAMPLE A 168 g of the chloroaminated beads produced according to Example 1 are hydrolysed with 500 ml of a 16 percent aqueous solution of hydrochloric acid. The mixture is stirred at 45° C. for 4 hours and then thoroughly washed with water until neutral. The aminomethylated polymer beads have a weak base capacity of 1.4 meq/ml. 120 g of the produced aminomethylated resin is placed into the reactor and 130 ml of water is added. Then a solution of 145 g of phosphorous acid in 65 ml of water and subsequently 53 g of paraformaldehyde and 45 ml of a 32 percent aqueous solution of hydrochloric acid are added. The mixture is maintained at 90° C. for 4 hours and then rinsed with water. According to the elementary analysis the prepared resin beads contain 3.25 percent nitrogen and 10.3 percent phosphor. The total copper wet volume capacity is 2.2 meq/ml. The dynamic total calcium capacity is 19.2 g calcium per liter of resin.

EXAMPLE 2

130 ml of the wet chloroaminated beads which have been prepared according to Example 1, are placed into a reaction vessel. 145 g of phosphorous acid which has been dissolved in 65 ml of water is added. The mixture is then heated to 90° C. Within 15 minutes the resin beads change their colour from yellow to orange which indicates that the methylphosphonation takes place. The reaction mixture is kept at 90° C. for 4 hours. After cooling to room temperature the resin is rinsed with water. The total copper wet volume capacity is 2.1 meq/ml. According to elementary analysis the beads contain 3.53 percent nitrogen and 9.52 percent phosphor. The dynamic total calcium capacity is 16.5 g calcium per liter of resin. After regeneration with 4N hydrochloric acid and 4N sodium hydroxide the dynamic total calcium capacity is 15.7 g calcium per liter of resin.

EXAMPLE 3

Example 2 is repeated, however, the reaction mixture is kept at 90° C. for 1 hour only. The total copper wet volume capacity is 1.8 meq/ml.

EXAMPLE 4

130 ml of the wet chloroaminated polymer beads produced according to Example 1 are placed into a reactor 145 g of phosphorous acid is dissolved in 175 ml of 16 percent aqueous hydrochloric acid. The solution is added to a reactor and the reaction mixture is heated to 90° C. for 4 hours. The produced aminomethylphosphonic chelating resin is thoroughly washed with water. The total copper wet volume capacity is 2.16 meq/ml.

EXAMPLE 5

Macroporous chloromethylated polymer beads are used which have a styrene-divinylbenzene copolymer matrix with a divinylbenzene content of 6 percent. The wet volume capacity is 1.3 meq/ml. 250 ml of the macroporous chloromethylated polymer beads are swollen for 45 minutes in 400 ml of formaldehyde dimethyl acetal at 44° C. A solution of 215 g of hexamethylenetetramine in 280 ml of water is added. The mixture is stirred for 6 hours at 46° C. The resulting chloroaminated polymer beads having groups of formula II wherein R1 is hydrogen, X is chlorine and m is 1 are filtered and thoroughly washed with water.

130 ml of the polymer beads are placed into a reaction vessel. A solution of 165 g of phosphorous acid in 75 ml of water and 220 ml of 16 percent aqueous hydrochloric acid are added. The reaction mixture is heated to 90° C. and maintained at this temperature for 4 hours. The produced aminomethylphosphonic chelating resin is thoroughly washed with water. Its total copper wet volume capacity is 2.71 meq/ml. The dynamic total calcium capacity is 13.5 g calcium per liter of resin.

COMPARATIVE EXAMPLE B 175 ml of the chloroaminated polymer beads which have been produced according to Example 5 are hydrolysed with 500 ml of 16 percent aqueous hydrochloric acid. The mixture is stirred at 45° C. for 4 hours and subsequently washed with water until neutral. The produced polymer beads having aminomethyl groups has a weak base capacity of 1.6 meq/ml.

130 ml of the aminomethylated polymer beads are mixed in a reaction vessel with 130 ml of water. A solution of 165 g of phosphorous acid in 75 ml of water, 61 g of paraformaldehyde and 40 ml of concentrated hydrochloric acid are added. The mixture is maintained at 90° C. for 4 hours and rinsed with water. The total copper wet volume capacity is 2.8 meq/ml. The dynamic total calcium capacity is 10.2 g per liter of resin. After regeneration with 4N hydrochloric acid and 4N sodium hydroxide the dynamic total calcium capacity is 8.4 g calcium per liter of resin.

EXAMPLE 6

130 ml of the chloroaminated polymer beads produced according to Example 5 are placed into a reaction vessel. A solution of 165 g of phosphorous acid in 75 ml of water and 240 ml of 20 weight percent aqueous sulphuric acid are added. The mixture is heated to 90° C. and maintained at this temperature for 4 hours. The produced aminomethylphosphonic chelating resin is washed with water. The total copper wet volume capacity is 2.41 meq/ml.

EXAMPLE 7

Chloroaminated beads are produced as described in Example 1. 65 ml of the beads contain 0.075 moles of groups of formula II wherein $R_1$ is hydrogen, X is chlorine and m is 1. 65 ml of the beads are suspended in 200 ml of water. 50 ml of $PCl_3$ having a density of 1.574 g/cm$^3$, i.e. 0.57 moles, is dropwise added to the suspension through a dropping funnel within 45 minutes. The molar ratio between $PCl_3$ and the groups of formula II is 7.6:1. The molar ratio between water and $PCl_3$ is 19.5:1. The suspension is stirred. The temperature gradually raises to 48° C. After addition of the total amount of $PCl_3$ the suspension is allowed to cool to 34° C. The reaction mixture is heated to 90° C. and maintained at this temperature for 4 hours. The suspension is then allowed to cool to ambient temperature and the resin is thoroughly washed with water. The total copper wet volume capacity is 2.3 meq/ml.

EXAMPLE 8

Chloroaminated beads are produced as described in Example 1. 130 ml of the beads contain 0.15 moles of groups of formula II wherein $R_1$ is hydrogen, X is chlorine and m is 1. 130 ml of the beads are suspended in 200 ml of water. 40 ml of $PCl_3$ having a density of 1.574 g/cm$^3$, i.e. 0.45 moles, is dropwise added to the suspension through a dropping funnel within 30 minutes. The molar ratio between $PCl_3$ and the groups of formula II is 3. The molar ratio between water and $PCl_3$ is 25. The suspension is stirred. The temperature gradually raises to 66° C. The reaction mixture is heated to 90° C. and maintained at this temperature for 4 hours. The suspension is then allowed to cool to ambient temperature and the resin is thoroughly washed with water. The total copper wet volume capacity is 2.0 meq/ml. The dynamic total calcium capacity is 16.9 grams calcium per liter of resin.

EXAMPLE 9

Example 8 is repeated, however, 130 ml of the beads are suspended in 600 ml instead of in 200 ml of water. Accordingly, the molar ratio between water and $PCl_3$ is 75. The total copper wet volume capacity is 1.6 meq/ml. The dynamic total calcium capacity is 14.0 grams calcium per liter of resin.

Example 9 illustrates that even diluted aqueous solutions of $PCl_3$ are useful for obtaining aminomethylphosphonic chelating resins with satisfactory ion exchange capacities.

EXAMPLES 10 TO 12

130 ml of the same chloroaminated beads as in Example 7 are used in Examples 10 to 12. They are stirred in a solution of 72.5 g (0.88 moles) of phosphorous acid in a varying amount of water. The molar ratio between phosphorous acid and the groups of formula II is 5.8:1 in all Examples 10 to 12. The suspension is heated to 90° C. and kept at this temperature for 4 hours. After cooling to room temperature the resin is thoroughly washed with water and its total copper wet volume capacity is determined.

In Example 10 the amount of water is 100 ml which corresponds to a 42 percent aqueous solution of phosphorous acid. The total copper wet volume capacity is 1.0 meq/ml.

In Example 11 the amount of water is 65 ml which corresponds to a 53 percent aqueous solution of phosphorous acid. The total copper wet volume capacity is 1.2 meq/ml.

In Example 12 the amount of water is 32.5 ml which corresponds to a 70 percent aqueous solution of phosphorous acid. The total copper wet volume capacity is 1.7 meq/ml.

EXAMPLES 13 TO 16

130 ml of the same type of chloroaminated beads as in Example 7 are stirred in a solution of a varying amount of phosphorous acid in 65 ml of water. The resin beads are reacted with the phosphorous acid as described in Examples 10 to 12.

In Example 13 100.8 g (1.23 moles) of phosphorous acid is used. This corresponds to a molar ratio of phosphorous acid to the groups of formula II in the chloroaminated beads of 8.2:1 and to a 60 percent aqueous solution of phosphorous acid. The total copper wet volume capacity of the produced aminomethylphosphonic chelating resin is 1.4 meq/ml.

In Example 14 130 g (1.59 moles) of phosphorous acid is used. This corresponds to a molar ratio of phosphorous acid to the groups of formula II in the chloroaminated beads of 10.6:1 and to a 67 percent aqueous solution of phosphorous acid. The total copper wet volume capacity is 2.0 meq/ml.

In Example 15 145 g (1.77 moles) of phosphorous acid is used. This corresponds to a molar ratio of phosphorous acid to the groups of formula II in the chloroaminated beads of 11.8:1 and to a 69 percent aqueous solution of phosphorous acid. The total copper wet volume capacity of the produced resin beads is 2.0 meq/ml.

In Example 16 180 g (2.2 moles) of phosphorous acid is used. This corresponds to a molar ratio of phosphorous acid to the groups of formula II in the chloroaminated beads of 14.6:1 and to a 73 percent aqueous solution of phosphorous acid. The total copper wet volume capacity of the produced resin beads is 2.1 meq/ml.

Examples 10 to 16 illustrate the total copper wet volume capacity depends on the amount and concentration of phosphorous acid which is used in the process of the present invention.

EXAMPLES 17 TO 22

130 ml of the same type of chloroaminated beads are used as in Example 7. The beads are reacted with a solution of a varying amount of phosphorous acid in 100 ml of 16 percent aqueous percent hydrochloric acid (0.51 moles HCl). The reaction temperature is kept at 90° C. for 4 hours. After cooling to room temperature and washing with water the total copper wet volume capacity is determined.

The used weight amount of phosphorous acid (A), the molar amount of phosphorous acid (B), the resulting weight percentage of phosphorous acid, based on the weight of the solution (C), the molar ratio between phosphorous acid and the groups of formula II in the chloroaminated resin beads (D) and the total copper wet volume capacity (E) are listed in Table 1. The molar ratio between hydrochloric acid and the groups of formula II in the chloroaminated beads is 3.4:1 in all Examples 17 to 22.

The dynamic total calcium capacity of the aminomethylphosphonic chelating resin produced according to Example 19 is 12.5 g calcium per liter of resin.

The comparison between Examples 17 to 22 with Examples 10 to 16 illustrates that the molar ratio (D) between phosphorous acid and the groups of formula II in the chloroaminated beads as well as the weight percentages of phosphorous acid in water can be significantly decreased while still obtaining an aminomethylphosphonic chelating resin with a high total copper wet volume capacity when the phosphonation takes place in the presence of a second acid such as hydrochloric acid.

TABLE 1

| Example | g H$_3$PO$_3$ (A) | Moles H$_3$PO$_3$ (B) | % H$_3$PO$_3$ in solution (C) | Molar ratio (D) | Copper capacity meq/ml (E) |
| --- | --- | --- | --- | --- | --- |
| 17 | 8 | 0.10 | 7 | 0.6:1 | 0.6 |
| 18 | 16 | 0.20 | 13 | 1.3:1 | 1.1 |
| 19 | 31 | 0.38 | 22 | 2.5:1 | 1.9 |
| 20 | 72.5 | 0.88 | 40 | 5.8:1 | 2.3 |
| 21 | 110 | 1.34 | 50 | 8.9:1 | 2.1 |
| 22 | 145 | 1.77 | 57 | 11.8:1 | 2.3 |

EXAMPLES 23 TO 26

130 ml of the same type of chloroaminated beads are used as in Example 7. The beads are reacted with a solution of 72.5 g (0.88 moles) of phosphorous acid in a varying volume of 16 weight percent aqueous hydrochloric acid. The molar ratio between phosphorous acid and the groups of formula II in the chloroaminated beads is the same as in Examples 12 and 20, i.e. 5.8:1. The suspension is heated to 90° C. for 4 hours. After cooling the mixture to ambient temperature the resin is thoroughly washed with water and its total copper wet volume capacity is determined.

The volume of 16 weight percent aqueous hydrochloric acid (F), the molar amount of hydrochloric acid (G), the resulting molar ratio between hydrochloric acid and the groups of formula II in the chloroaminated resin beads (H), the resulting weight percent of phosphorous acid, based on the weight of the solution (I) and the total copper wet volume capacity (J) of the produced aminomethylphosphonic chelating resin are listed in Table 2. For completing the table, the results of Examples 12 and 20 are repeated.

TABLE 2

| Example | ml weight percent HCl (A) | Moles HCl (G) | % H$_3$PO$_3$ in water (I) | Molar ratio (H) HCl:CH$_2$NH$_2$ groups | Copper capacity meq/ml (J) |
| --- | --- | --- | --- | --- | --- |
| 12 | | | | 70 | 1.7 |
| 23 | 32.5 | 0.17 | 1.1:1 | 67 | 2.0 |
| 20 | 100 | 0.51 | 3.4:1 | 40 | 2.3 |
| 24 | 250 | 1.27 | 8.5:1 | 21 | 2.2 |
| 25 | 500 | 2.54 | 17.0:1 | 12 | 2.1 |
| 26 | 1000 | 5.08 | 34.0:1 | 6 | 1.8 |

Examples 20 and 23 to 26 illustrate that the total copper wet volume capacity of the produced aminomethylphosphonic chelating resins is not substantially dependent of the weight percent of phosphorous acid in the aqueous solution if a second acid such as hydrochloric acid is present in the reaction mixture.

EXAMPLE 27

104 g of the same chloromethylated copolymer beads as in Example 1 are swollen in 180 ml of formaldehyde dimethyl acetal at 45° C.–50° C. for 110 minutes.

To the mixture of the chloromethylated beads and formaldehyde dimethyl acetal a solution of 47 g of hexamethylenetetramine in 63 g of water is added. The reaction mixture is stirred for 8 hours at 45° C.–50° C. The mixture is cooled down to 30° C., the produced chloroaminated beads having groups of formula II wherein R1 is hydrogen, m is 1 and X is chlorine are filtered off and thoroughly washed with water.

157 g of the wet chloroaminated beads are suspended in 300 g of water at 20° C. in an autoclave. 80 ml of PCl3 is added to the suspension batchwise in the following way: 40 ml of PCl3 is added at once. The temperature raises to 90° C. and the pressure in the reactor to 3.5 bar. When the mixture is cooled to 60° C. another 20 ml of PCl3 is added. The temperature and pressure raise again. After cooling to 60° C. again 20 ml of PCl3 is added. The mixture is maintained for 6 hours at 90° C. after the last portion of PCl3 has been added.

The molar ratio between water and PCl3 is 45:1. The suspension is stirred with 60 rpm (revolutions per minute).

The suspension is then allowed to cool down to 35° C., the resin beads are filtered off and thoroughly washed with water.

The total copper wet volume capacity is 2.0 meq/ml.

EXAMPLE 28

Example 27 is repeated, however, the entire amount of PCl3 is divided in two portions only instead of in three portions. During the addition of PCl3, the temperature raises to 115° C. and the pressure up to 4.5 bar.

The total copper wet volume capacity is 2.0 meq/ml.

EXAMPLE 29

150 g of the chloromethylated beads produced according to Example 1 are hydrolyzed with 300 ml of a 20 percent aqueous solution of hydrochloric acid. The mixture is stirred at 45° C. for 4 hours. Then 145 g of solid phosphorous acid is added to the reaction mixture and the mixture is heated to 90° C. This temperature is maintained for 4 hours. After cooling to room temperature, the resin is rinsed with water. The total copper wet volume capacity is 1.90 meq/ml.

What is claimed is:

1. A process for preparing an aminomethylphosphonic chelating resin by amination, hydrolysis and methylphosphonation of haloalkylated polymer beads wherein the haloalkylated polymer beads are aminated with hexamethylenetetramine and the produced haloaminated beads are hydrolysed and methylphosphonated in one single step without addition of a substantial amount of formaldehyde or a formaldehyde releasing compound.

2. The process of claim 1 wherein the chelating resin has functional groups of the formula

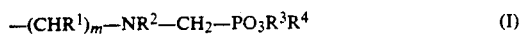  (I)

wherein
$R^1$ is hydrogen, alkyl, cycloalkyl or aryl;
$R^2$ is hydrogen or $-PO_3R^3R^4$;
$R^3$ and $R^4$ each independently are hydrogen, alkyl, cycloalkyl or aryl; and
m is from 1 to 12.

3. The process of claim 1 wherein the haloaminated beads have groups of the formula II

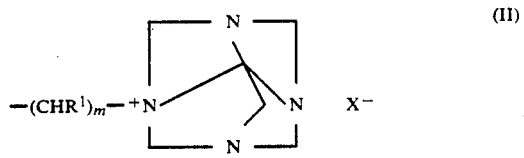  (II)

wherein each $R^1$ is hydrogen, m is 1 and X is chlorine.

4. The process of claim 1 wherein the hydrolysis and methylphosphonation is carried out with phosphorous acid, a phosphite salt or a mono- or diester of phosphorous acid in the presence of acid and water in one single step without addition of formaldehyde or a formaldehyde releasing compound.

5. The process of claim 1 wherein the hydrolysis and methylphosphonation is carried out with $PCl_3$ in the presence of water in one single step without addition of formaldehyde or a formaldehyde releasing compound.

6. The process of claim 3 wherein the hydrolysis and methylphosphonation is carried out with phosphorous acid, a phosphite salt or a mono- or diester of phosphorous acid in the presence of an acid and water.

7. The process of claim 3 wherein the hydrolysis and methylphosphonation is carried out with $PCl_3$ in the presence of water.

8. The process of claim 1 wherein the resin has a matrix of a cross-linked polystyrene or poly(alphamethyl)styrene.

9. The process of claim 3 wherein the resin has a matrix of a cross-linked polystyrene or poly(alphamethyl)styrene.

10. The process of claim 1 wherein the hydrolysis and methylphosphonation is carried out at a temperature of from 40° C. to 150° C.

11. The process of claim 1 wherein the hydrolysis and methylphosphonation is carried out at a temperature of from 70° C. to 100° C.

12. The process of claim 3 wherein the hydrolysis and methylphosphonation is carried out at a temperature of from 40° C. to 150° C.

13. The process of claim 3 wherein the hydrolysis and methylphosphonation is carried out at a temperature of from 70° C. to 100° C.

14. The process of claim 6 wherein the hydrolysis and methylphosphonation is carried out at a temperature of from 70° C. to 100° C.

15. The process of claim 7 wherein the hydrolysis and methylphosphonation is carried out at a temperature of from 70° C. to 100° C.

16. A process for preparing an aminomethylphosphonic chelating resin by hydrolysis and methylphosphonation of haloaminated polymer beads having groups of formula II

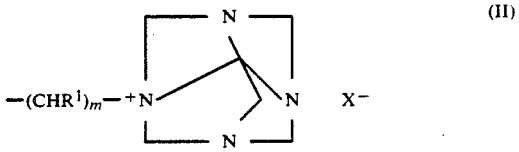  (II)

wherein each $R^1$ independently is hydrogen, alkyl, cycloalkyl and aryl,
X is halogen and
m is from 1 to 12,
wherein the hydrolysis and methylphosphonation is carried out in one single step without addition of a substantial amount of formaldehyde or a formaldehyde releasing compound.

17. The process of claim 16 wherein the hydrolysis and methylphosphonation is carried out with phosphorous acid, a phosphite salt or a mono- or diester of phosphorous acid in the presence of acid and water in one single step without addition of formaldehyde or a formaldehyde releasing compound.

18. The process of claim 16 wherein the hydrolysis and methylphosphonation is carried out with $PCl_3$ in the presence of water in one single step wihout addition of formaldehyde or a formaldehyde releasing compound.

* * * * *